Figure 1:
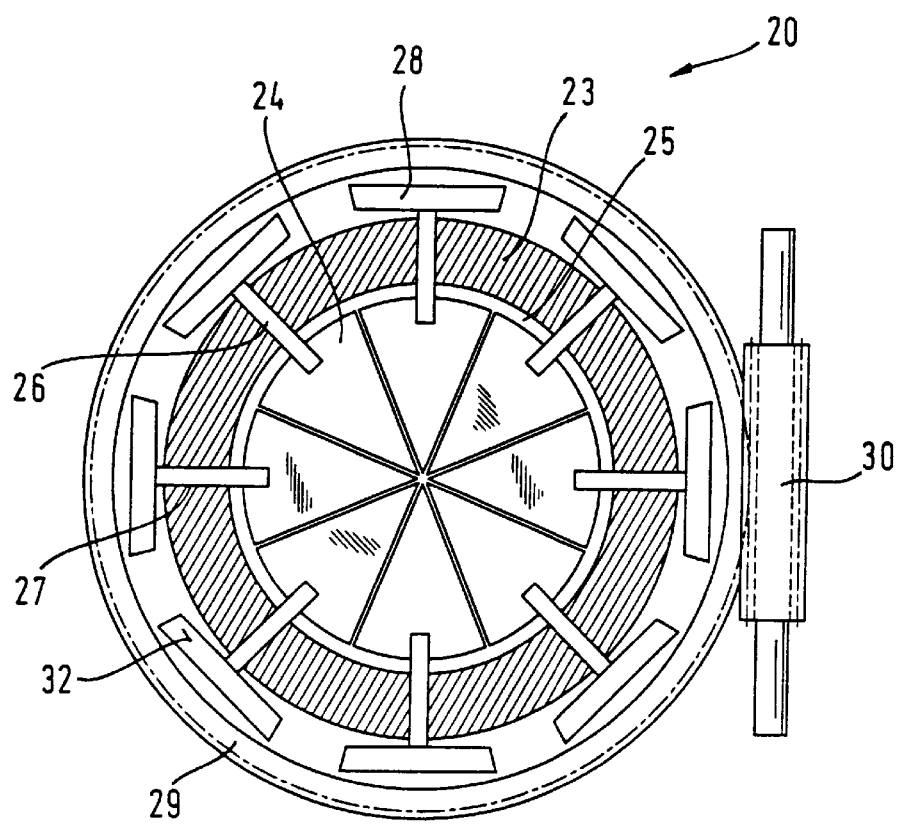

United States Patent [19]
Mächler

[11] Patent Number: 6,005,661
[45] Date of Patent: Dec. 21, 1999

[54] OPTICAL SYSTEM WITH WIDE MEASURING RANGES

[75] Inventor: Meinrad Mächler, Ellwangen, Germany

[73] Assignee: Hewlett-Packard Company, Palo Alto, Calif.

[21] Appl. No.: 08/913,299

[22] PCT Filed: Mar. 14, 1996

[86] PCT No.: PCT/EP96/01115

§ 371 Date: Nov. 14, 1997

§ 102(e) Date: Nov. 14, 1997

[87] PCT Pub. No.: WO96/28748

PCT Pub. Date: Sep. 19, 1996

[30] Foreign Application Priority Data

Mar. 14, 1995 [DE] Germany ............................ 195 091 57

[51] Int. Cl.$^6$ .................................. G01J 3/14; G01J 3/20
[52] U.S. Cl. ............................................ 356/326; 356/328
[58] Field of Search ..................................... 356/326, 328, 356/319

[56] References Cited

U.S. PATENT DOCUMENTS 5,223,715  6/1993  Taylor ........................................ 356/319
5,675,411  10/1997  Brooks et al. ............................ 356/328

*Primary Examiner*—F. L. Evans
*Attorney, Agent, or Firm*—Burns, Doane, Swecker & Mathis, L.L.P.

[57] ABSTRACT

The invention concerns an optical system for use in spectrometry and/or endoscopy, in which at least one probe is exposed to directional radiation produced by a radiation source, the radiation emanating from the probe is led to a spectrometer, in particular a simultaneous spectrometer, and/or an imaging device. It is proposed that the optical system should be provided with at least one control device with an radiation inlet surface and a radiation outlet surface; the control device should be provided with control elements held by a frame and capable of being displaced from a first position in such a way that the radiation energy transferred from the radiation inlet surface to the radiation outlet surface can be controlled while leaving the radiation outlet aperture substantially unchanged. In addition, or alternatively, the optical system is provided with at least one wavelength selection unit which has at least one dispersion element for spectral splitting of the radiation passing through at least one inlet slit and impinging on the dispersion element; and with at least one optical waveguide. The dispersion element and/or a focusing element focus the spectrally split radiation onto a focal surface and the optical waveguide receives a predetermined range of spectrally split radiation in the focal surface.

36 Claims, 8 Drawing Sheets

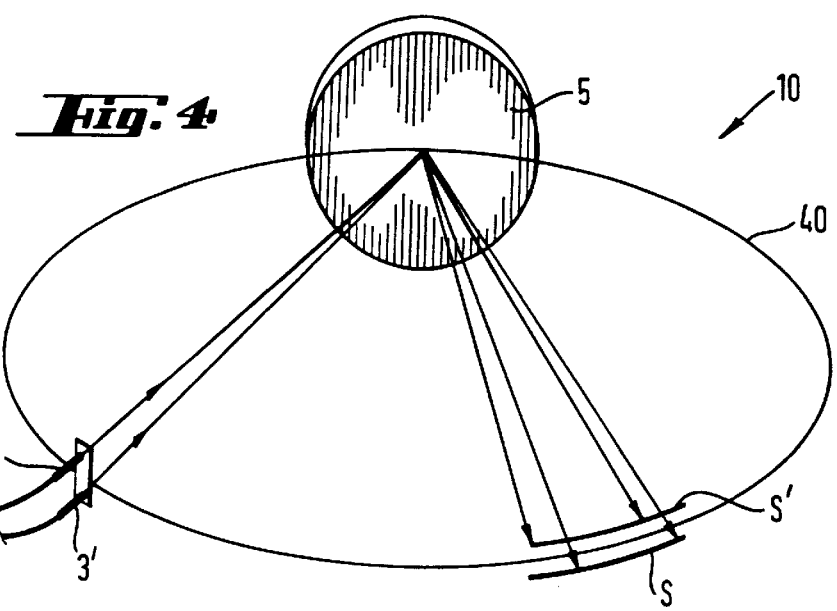
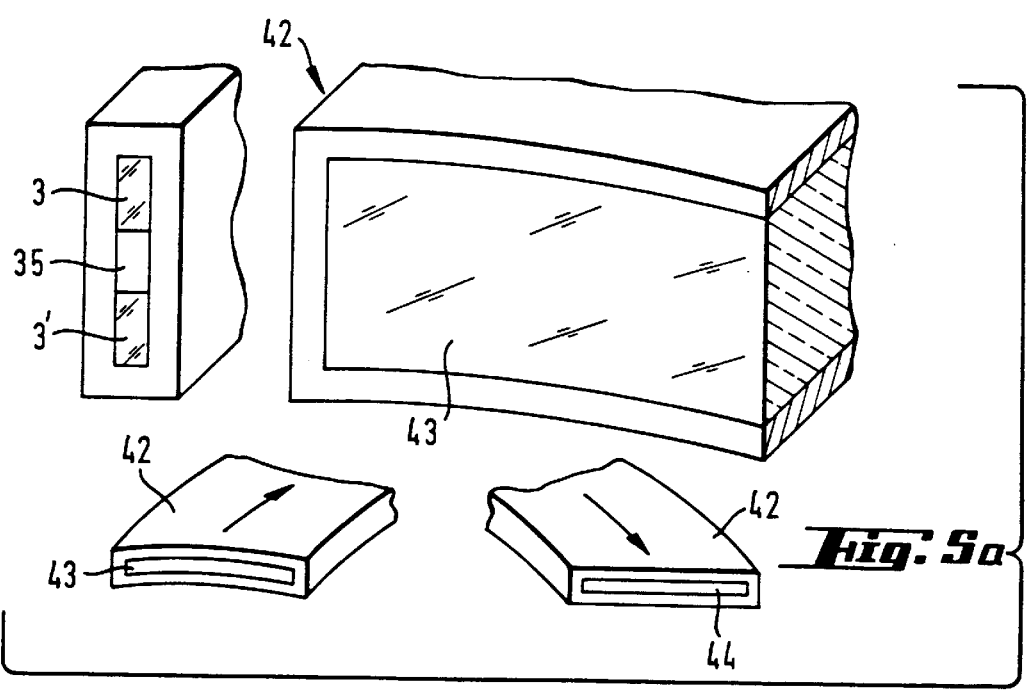
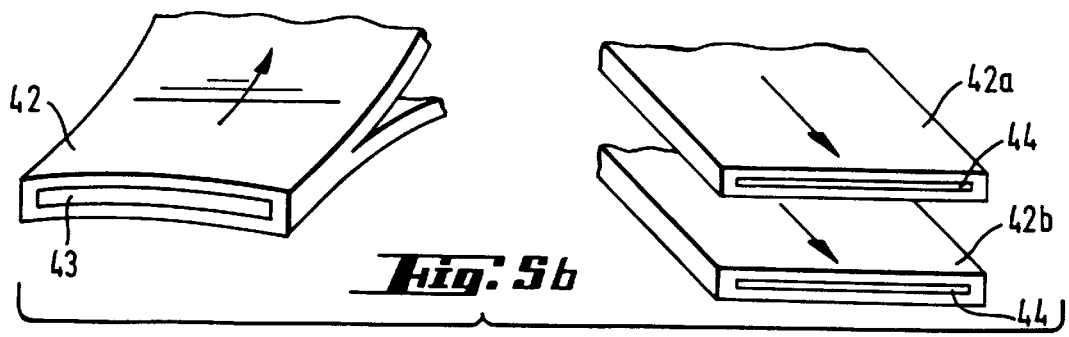

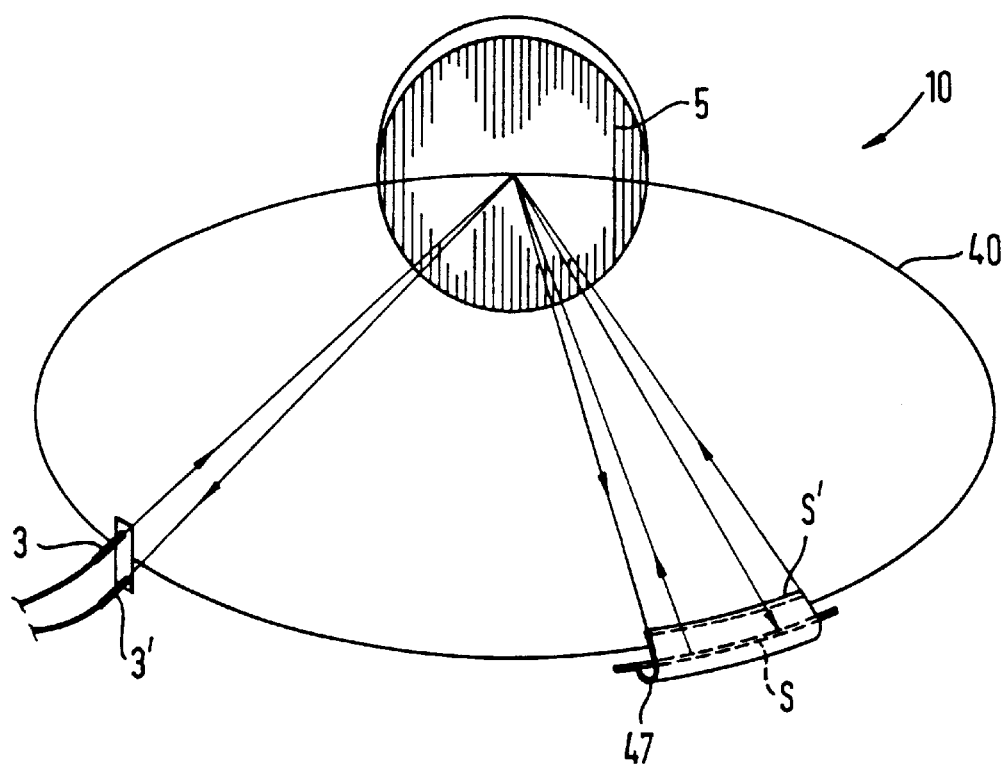

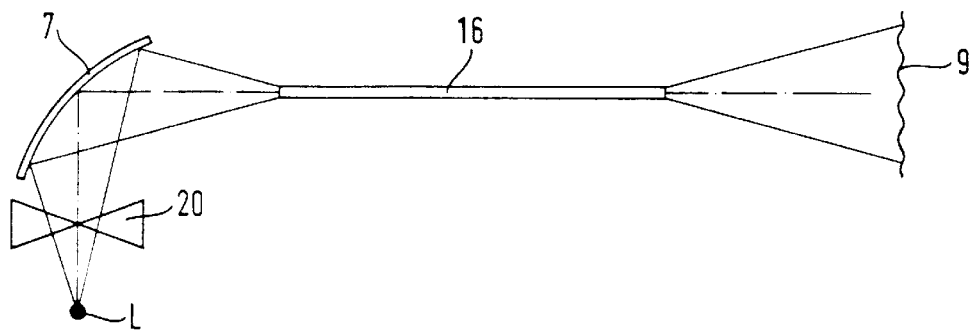
*Fig. 8*
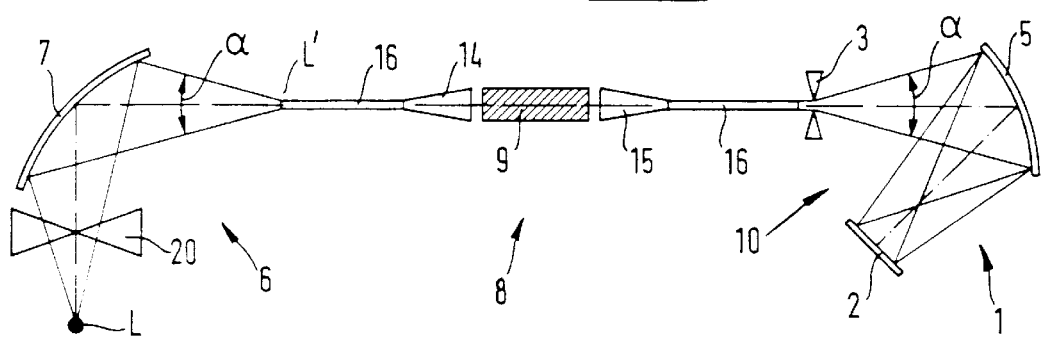
*Fig. 9*
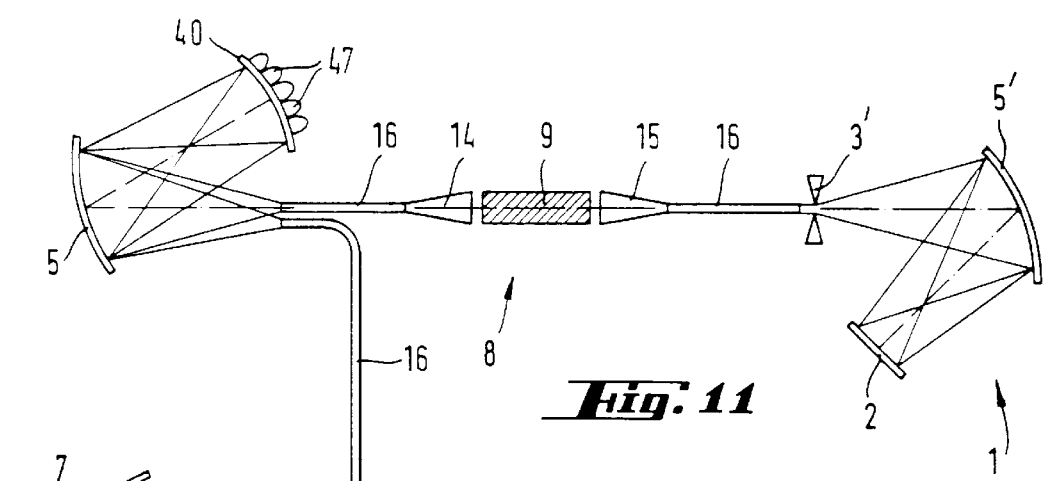
*Fig. 11*
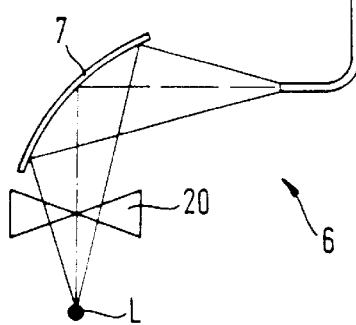

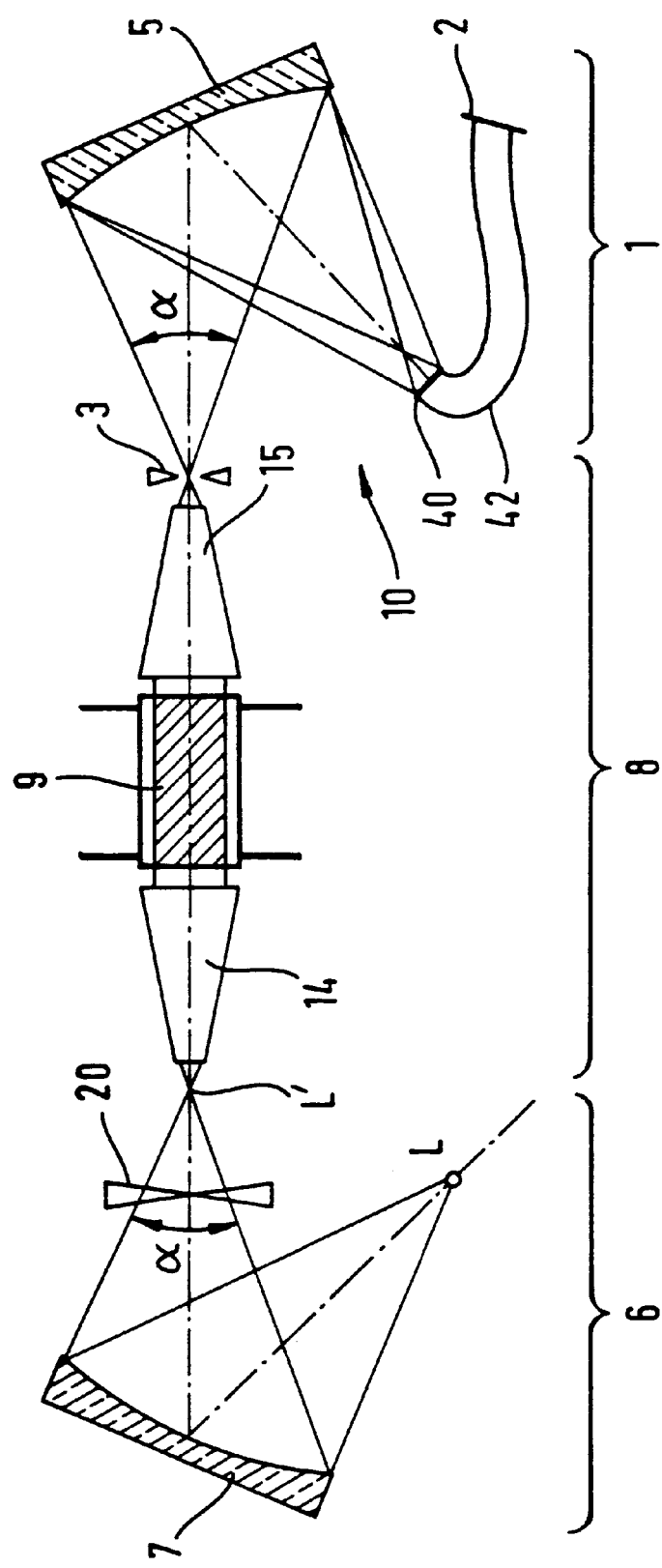

OPTICAL SYSTEM WITH WIDE MEASURING RANGES

The invention relates to a control device, in particular for spectroscopy, endoscopy and/or radiometry systems, and a wavelength selection device, in particular for spectroscopy, endoscopy and/or radiometry systems as well as the optical systems comprised thereof for spectroscopy, endoscopy and/or radiometry.

A known spectroscopic system in which a spectrometer or a simultaneous spectrometer, respectively, is used, conventionally comprises an illumination device, a sample and a simultaneous spectrometer. The radiation emitted by the illumination device permeates the sample and is incident upon the entrance slit of the simultaneous spectrometer, which spectrally splits and, by a receiver unit, detects the incident radiation. In this way, for example, the absorption of the sample can be determined as a function of the frequency of the radiation.

The core concept of a frequently used simultaneous spectrometer is the use of rows of self-scanning diodes developed by Snow in 1975 and which comprise for example 512 discrete diodes on a length of 1.27 cm. The application, developed by the applicant, of these diode rows in a spectrometer is determined by the row geometry, wherein one diode width of 25 µm defines simultaneously the width of the exit slit of the spectrometer. In an image with the smallest error rate, i.e. 1:1, this represents also the width of the entrance slit. As a dispersive element in such a simultaneous spectrometer a holographically generated concave grating is used, which permits saving an additional focusing element.

Frequently an illumination device adapted to the structure of the simultaneous spectrometer is used. Light is emitted by a preferably point-form light source and focused into an object space. In order for the spectrometer to be utilized with maximum efficiency, the same configuration is basically used in the illumination device as in the spectrometer with the highly-open hologram grating being replaced by an aspherical (ellipsoidal) mirror of identical aperture. In order for a "complete representation" being attained, thus the strictly conjugated sequence of source diaphragm-objective diaphragm etc., the mirror has the dimension of the grating of the spectrometer. Of the light source and the image of the light source, which simultaneously is the entrance diaphragm into the measuring instrument, is required that they are very small. Instead of the light source L a maximally high luminous intensity is required. This condition is met for example by xenon lamps of the lowest power class of 30 to 75 W at a radiant field diameter of 0.3 to 0.5 mm. For the ultraviolet region deuterium lamps with radiant field diameters of 0.5 mm with high luminous intensity and 35 W power consumption are available.

Between the light source image and the entrance slit of the spectrometer is located the object space in which the directional illumination of an object or a sample is required. The sample is disposed for example in a cell which is transilluminated at slight radiation inclination against the optical axis, in the ideal case with telecentric illumination. To meet this, on both sides of the sample one aperture converter each can be disposed which comprises a coaxial conical optical waveguide or mirror, with a light entrance and a light exit opening and a mirroring or totally reflecting inner surface.

Such optical system is distinguished by very good energy efficiency, i.e. a large portion of the radiation emitted by the illumination device is incident upon the sample and proceeds from the sample to the simultaneous spectrometer. Furthermore, such system is distinguished by good utilization of the capabilities of the simultaneous spectrometer. To attain high spectral resolution, the spectrometer requires at the entrance slit radiation having a very large aperture. This is made available through the aperture converters.

In such system, however, a number of difficulties occur which make further improvements desirable.

In order to utilize the capabilities of the simultaneous spectrometer as well as possible, work takes place with light sources of maximum luminous intensity. In practice, these are preferably high-pressure arc lamps, for example xenon lamps. Without exception, these lamps are operated at constant power so that thereby the highest attainable luminous intensity of a selected configuration is defined. Due to the good energy efficiency this can lead to the fact that more radiation is incident upon the diodes of the spectrometer than is required for saturation, i.e. at the start of a measurement, thus, potentially too much radiation is present. If the absorption of a sample with very high coefficient of absorption is measured, very little light is incident upon the diodes of the spectrometer. The signal-to-noise ratio is correspondingly poor.

It would therefore be desirable if the intensity of the radiation used could be varied with specificity and definition. For this purpose grey or neutral glass was previously used, which stops down a portion of the radiation in fixed stages or as a wedge. However, these absorbing diaphragms are not very suitable in spectroscopy and endoscopy since they modify the path of the rays and, in addition, are not spectrally neutral and thus exert a negative effect on the result of spectral measurements. Furthermore for stopping down, mechanical pinhole diaphragms for insertion or continuously adjustable iris diaphragms are used. These diaphragms, however, reduce the aperture of the radiation and thus in spectroscopy the spectral resolution, and in endoscopy the field of vision.

A similar problem is frequently also encountered in radiometry, for example when measuring the luminous intensity (candela) of a new light source.

According to the International System of Units (SI system) one candela (cd) in a given direction is the luminous intensity of a monochromatic radiation source of frequency 540 terahertz with a radiant intensity in this direction of 1/683 Watt per steradian. If the luminous intensity of a new light source is to be measured, the procedure in practice is frequently as follows:

A receiver, for example a photodiode, is illuminated with the light of a standardized light source, for example a black-body emitter with a given temperature. The resulting output value of the receiver unit, for example a photo-electric current, is assigned to the known luminous intensity of the standardized light source. However, this one assignment in general is not sufficient to be able to measure the luminous intensity of a new light source, since normally no linear relationship exists between the luminous intensity incident upon the receiver and the output value of the receiver. For example, if the new light source is to have a luminous intensity of twice the magnitude as the standardized light source, the twofold photo-electric current would not necessarily result since the photodiode is potentially already close to saturation.

For this reason, the receiver must be illuminated with the light of further standardized light sources in order to be able to determine by approximation the functional relationship between the luminous intensity incident upon the receiver and the output value of the receiver. Only with these additional data is it possible to calculate with the output value of the receiver, which results during illumination with the new light source, the luminous intensity of the new light source.

Since the determination of the functional relationship between the luminous intensity incident upon the receiver and the output value of the receiver is a cumbersome and cost-intensive procedure, it would be desirable if a single assignment of an output value of the receiver to the luminous intensity of a standardized light source would suffice to determine the luminous intensity of the new light source.

A further difficulty of a spectroscopic system according to prior art results from the type of wavelength selection. This relates to the selection of the radiation which is detected by a receiver unit, as well as also the selection of the radiation incident upon the sample.

The simultaneous spectrometers conventionally used for detecting the radiation comprise an entrance slit, a holographically generated concave grating, and a linear row of photodiodes. These components are fixedly mounted for example with a rigid frame. Such a permanently set configuration without mechanically mobile components has the advantages of robustness and reliability together with high precision and optimum energy efficiency.

However, given this structure the spectral acquisition by the row of diodes is limited. The reason for this can be found in the fact that the row chips as monocrystals by necessity must be planar while the focal surface of the concave grating is a curve, or stated more precisely a circle (Rowland circle). The production of the holographic concave grating does indeed permit corrections in the direction of a segmental flattening of the spectra, however, again at the price of nonlinear dispersion and considerable complications in the reproducibility during fabrication. In addition, due to the spherical support surface of the concave grating, the spectra are afflicted with the usual image errors, such as spherical aberration, coma and astigmatism. Through specific spacial corrections of the source points of the hologram, the production of the holographic concave grating permits reducing the image errors. When using rows of planar photodiodes, however, a large portion of the correction possibilities for spectral flattening is exhausted. It is, in addition, understood that a satisfactory flattening in terms of a tangent or secant to the Rowland circle can only be successful on a very limited segment of the Rowland circle. The spectrometer is then fixed onto this segment. This leads to the fact that always only a small portion of the spectrum can be acquired and detected.

Furthermore, in simultaneous spectrometry of sensitive substances in biochemistry and photochemistry the problem occurs that before the spectral splitting the sample is loaded with the integral radiation of the radiation source. This leads to the fact that also spectral ranges (for example infrared) are incident upon the sample which are not of interest for the measurement proper, but can be damaging to the sample due to the absorptions in the sample.

In order to eliminate this problem, previously two Rowland grating spectrometers with oppositely oriented dispersions were connected in series, wherein it was necessary, however, to use intermediate optics for the spectral flattening. With two movable slit flanges in the central spectral plane the desired spectral range could be screened out such that at the exit slit of the second grating spectrometer "white" light with precisely defined spectral width was again available. The apparatus-related expenditures with two gratings and the flattening optics, which is not simple to achromatize, is relatively high, so that this method has not been widely used.

It would therefore be desirable if a device for selecting wavelengths could be made available which would make possible the simultaneous measurement of a spectrum over a wide wavelength range and/or the illumination of a sample with a precisely defined spectral width.

It is therefore an object of the present invention to create optical systems which permit measurements over a wide intensity range and/or over a wide or precisely defined, respectively, wavelength range. This object is solved according to the invention by the provision of a control device, the wavelength selection device and through optical systems. Further advantageous embodiments, details or aspects of the present invention are evident in the specification and the enclosed drawings.

The present invention provides a control device for spectrometry, endoscopy and/or radiometry, in which a radiation entrance and a radiation exit surface is provided, wherein the control device comprises control elements held by a frame, which can be converted from a first position into a second position such that the radiation from the radiation entrance surface to the radiation exit surface is controllable while the aperture of the radiation is substantially constant.

By using the control device according to the invention in an optical system, an observer in endoscopy always obtains a fully illuminated visual field. Upon actuation of the control device only the brightness changes but not the field of vision or the color of the light. However, the color of the light can be specifically changed if such is desired. With photographic exposures the control device can assume the function of the preset diaphragm of a camera. This has the advantage that the object is illuminated only with the correct brightness for the exposure and is not, as previously, flooded with (flash) radiation.

In the field of spectrometry a number of advantages are also gained. Arrays of photodiodes have a limited dynamic range of approximately 16 bits. In contrast to multipliers a direct signal amplification is not possible. If during spectrometric investigations spectral or time absorption differences of two or more extinction stages occur, the demand on the analytical accuracy of a simultaneous spectrometer is excessive. However, there can be so-to-speak added or subtracted extinction stages by means of the control device. Thus, with unchanged spectral resolution it is possible to work always in the range of optimum sensitivity of the photodiodes.

The frame advantageously defines an opening into which the control elements extend and it is preferred that the position of the control elements of the control device is continuously variable. Since most of the beam paths comprise a circular cross section, it is preferred if the frame of the control device comprises parallel to the radiation entrance surface an annular cross section and defines a circular opening.

In that case the control elements are preferably thin circle segments which extend from the frame into the opening and are supported in the frame such that they are rotatable about their axis of symmetry. It is also of advantage if each of the circle segments comprises a shaft supported rotatably in bearings, preferably friction bearings.

It is especially preferred if at least three circle segments are provided which, when they are oriented parallel to the radiation entrance surface, cover substantially the entire opening of the control device.

It is useful if the control elements are connected with means for position change which are preferably disposed on the outside of the frame. The means for position change comprise preferably wheels which are each connected via shafts with the circle segment and which comprise contact surfaces. It is also useful if the means for position change comprises a spur gear which is preferably disposed rotatably on the outside of the frame and is in contact with the wheels via a contact surface.

It is furthermore preferred if the contact surface of the spur gear is sloped such that the extension of the contact surface is directed without offset toward the intersection of the center axes of the spur gear and of the axis of symmetry of the circle segments.

Through this choice of the slope of the contact surface of the spur gear a slip between spur gear and the wheels of the control elements can largely be avoided. It is thus ensured that upon a change of the position of the control elements, good reproducibility of the particular settings is obtained. This good reproducibility also does not depend on whether or not between the wheels of the control elements and the spur gear a point or line contact exists. Variations in the radial disposition of the wheels on the shafts of the control elements also do not exert a disadvantageous effect as long as only one contact exists between the wheels and the spur gear.

If is furthermore preferred if the wheels of the control elements are implemented as bevel wheels and the contact surfaces of the bevel wheels are sloped corresponding to the contact surface of the spur gear.

The contact surface of the spur gear and the contact surfaces of the wheels can be worked to be smooth, in particular ground, such that a nearly unlimited resolution results. To avoid slip, it is also preferred if between the spur gear and the wheels a permanent-magnet closure is provided.

A worm drive is preferably provided for driving the spur gear which permits implementing the adjustment of the control device such that it is nearly arbitrarily sensitive. The worm drive is preferably computer controlled so that the most complicated regulation tasks can be realized.

In a preferred embodiment the control elements are produced of metal and preferably coated with a corrosion protection. Thereby the control of the intensity of the radiation used can be ensured, completely independent of the shaft length.

In some situations, however, a specific influence of a definite portion of the spectrum is desired. In this case it is appropriate if the control elements are produced of a material which acquires and/or reflects a predetermined portion of the spectrum of the radiation. The control device in this case acts in the manner of a mosaic filter.

The present invention furthermore describes a wavelength selection device which comprises at least one dispersion element for the spectral splitting of the radiation incident through at least one entrance slit onto the dispersion element and at least one optical waveguide, wherein the dispersion element and/or one focusing element focuses the spectrally split radiation onto a focal surface and the optical waveguide acquires a predetermined range of the spectrally split radiation in the focal surface.

As stated above, the spectra, generated from the dispersion elements or additional focusing elements, are on focal surfaces or focal curves. According to the invention the spectrum is not utilized directly, for example imaged onto the receiver unit, but rather a predetermined range of the spectrally split radiation is acquired by one or several optical waveguides and for example conducted further to the sample or to the receiver unit.

Thereby very large segments of the spectrum can be selected and for example detected since the optical waveguide(s) can adapt readily to the focal surface. Flattening of the spectrum can be omitted entirely as well. The configuration according to the invention has furthermore the advantage that interfering scattered light can be almost completely switched out. Thus, a photodiode element on a row of diodes acquires light from the entire half-space in front of its receiver surface and integrates therewith over the total scattered light in a spectrometer which, inter alia, emanates from the wall reflections of the different spectral orders. An optical waveguide can only acquire and transmit radiation from a specific solid angle. In the case of currently, customarily used UV optical waveguides this is an angle of approximately 26°. The apertures of the spectrometers are tuned to this angle or a smaller angle. The optical waveguides can therefore only acquire the usable light directed onto them and are blind to any radiation from another angle range. This gain of switching-out false light outweighs by far the loss generated by the additional transmission loss.

The wavelength selection device according to the invention has further the advantage that the limited space within a spectrometer is better utilized. The receiver surface proper of the row of diodes is a central portion of a highly integrated circuit. This highly integrated circuit is much greater than the receiver surface itself, i.e. spectral ranges which directly adjoin the row area are lost. The most aggravating consequence of this limitation of conventional spectrometers is the inability to work with small splitting angles in the spectrometer. A further consequence of the relatively large structural volumes of the receivers in the preferably very small and compact spectrometer is the problem of accommodating cooling devices, for example for diode rows, or the series-connection of image amplifiers, for example, channel plates, which, in many cases, are required when examining low-energy events. Through the wavelength selection device according to the invention is obtained a high degree of freedom for accommodating the receiver unit since now it does not need to be disposed in the proximity of the focal surfaces. For maintenance or the replacement of the receiver unit thus great advantages accrue.

Even if the wavelength selection device according to the invention is disposed in the form of a monochromator or polychromator, respectively, in front of the sample to be examined, a number of advantages result. Through the wavelength selection device according to the invention without great apparatus-related expenditures, radiation with precisely defined spectral width can be generated. Investigations of highly sensitive samples, such as were previously reserved only for large scientific projects, can now be carried out simply and cost-effectively.

In order for the radiation to enter with good efficiency into the optical waveguide and the component of the scattered light be effectively suppressed, it is preferred if the end of the optical waveguide disposed in the focal surface is oriented toward the dispersion element or opposing the center ray of the particular real image of the entrance slit.

It is further preferred if several optical waveguides are provided as optical waveguide bundles laid out in order. It is therein preferred if the substantially uninterrupted front face of the optical waveguide bundle is adapted to the focal surface of the spectrometer. In this situation it is also preferred if the ends of the optical waveguides disposed in the focal surface are each oriented individually toward the dispersion element or opposite the center ray of the particular real image of the entrance slit. Depending on the position of the optical waveguide bundle on the focal surface, this can lead to the fact that between adjacent optical waveguide ends an angle occurs or that the optical waveguide ends must be disposed offset in steps; but such a configuration is preferred for reasons of energy and for reasons of suppression of scattered light.

It is furthermore useful if the optical waveguide is movable along the focal surface. The contour of the guideways on the focal surface for a socket of the optical waveguides or optical waveguide bundles is usefully asymmetric, so that the sockets can be set in form-fittingly and non-interchangeably. In addition, it is useful to code the guidance path in partial sections in order to be able to reproduce reliably specific positions. This coding can be carried out mechanically through rastering, optically or electronically, for example through magnetic strips.

It is furthermore preferred if the diameter of the fibers of the optical waveguide is selected according to the analytical resolution in the focal surface; for reasons of energy, however, it should not be less than 25 μm.

If radiation with precisely defined spectral width is required, it is useful if the optical waveguide bundle is disposed at that location in the focal curve at which the desired portion of the spectrum is present and the optical waveguide bundle conducts the acquired radiation again to the dispersion element such that through the negative dispersion at an exit slit of the wavelength selection device radiation with precisely defined spectral width can be generated.

To this end it is preferred if the optical waveguides conduct the radiation acquired in the focal surface again into the focal surface, however, to a region of the focal surface spaced apart from the location of the radiation acquisition. From there the radiation is radiated back in the direction toward the dispersion element.

If radiation with precisely defined spectral width but substantially unchanged geometry and aperture is required, it is preferred if the optical waveguide of the optical waveguide bundle conducts the radiation acquired in the focal surface back into the focal surface such that the configuration of the optical waveguide ends acquiring the radiation is mirror-symmetrical to the configuration of the optical waveguide ends emitting the radiation.

Furthermore it is preferred if in front of the front face, acquiring the radiation, of the optical waveguide bundle, masks or diaphragms are disposed which are preferably displaceable. In this way it is possible to select in simple manner subsequently the desired spectral ranges without needing to change the configuration of the optical waveguides itself.

In order for a laser-like bundle of rays with a precisely defined spectral range to be generated, it is preferred if the radiation generated at the exit slit can be supplied to an aperture converter which comprises a coaxial, conical optical waveguide or mirror with a light entrance and a light exit opening. If, for example, the wavelength selection device according to the invention is used with a strong xenon lamp and if the optical waveguide bundle in the wavelength selection device is disposed such that the UV range (about 200 nm) of light is acquired, a light beam is obtained following the aperture converter, which in view of the luminous intensity can entirely compete with a conventional excimer laser which, however, can be produced considerably less expensively.

In a preferred embodiment the receiver unit comprises at least one diode row. It is furthermore preferred if the optical waveguide bundle can be subdivided and supplied to several diode rows and/or an areal configuration of photodiodes. On the receiver side, thus in front of the active areas of the diode rows or areal arrays, the optical waveguide bundle terminates preferably in a socket with an elongated planar surface adapted to the geometry of the diode configuration. The preferably planar exit surface of the optical waveguides is now emplaced directly onto the light-sensitive zone of the diode configuration. The dimensions are preferably selected such that the areas agree and the screened-out spectral segment is precisely as long as the active area of the row. As was the case already at the spectrometer, here also a form-fitting and non-interchangeable connection is preferably created. For this purpose, for example onto the socket body of the configuration is emplaced a "keyhole mask", in which the optical waveguide socket fits exactly as the associated key such that the optical contact can be produced without access of scattered light optimally and reproducibly. In this way it is also possible to omit windows in front of the row chip or to insert between the optical waveguide end and the diode further optical elements such as image amplifiers.

In a further preferred embodiment two separate entrance slits are provided so that in the focal surface two separate spectra are generated, and optical waveguides which each acquire at least a portion of the spectrally split radiation in the focal surface and for example conduct it to the receiver unit.

In a preferred embodiment the dispersion element is a prism, preferably a Féry prism. In a further preferred embodiment the dispersion element is a diffraction grid, preferably a concave grating. When using a Féry prism or a concave grating, the dispersion element itself has already imaging characteristics so that further focusing elements can be omitted. In this way small and compact wavelength selection devices result and thus small and compact spectrometers.

If a diffraction grid is used, sine rulings, rectangular rulings or sawtooth rulings can be used. It is preferred if the diffraction grid is a holographic diffraction grid. Since through the use of the optical waveguides a flattening of the spectrum is superfluous, the correction possibilities, which result from the holographic generation of the grating, can be used for the purpose of reducing the image errors, such as coma, spherical aberration and astigmatism.

Furthermore, according to the invention an optical system for spectrometry and/or endoscopy is provided in which at least one sample is directionally illuminated by means of radiation emanating from a radiation source and the radiation emanating from the sample is conducted to a receiver unit and/or to an imaging arrangement. This system is characterized thereby that at least one control device according to the invention or at least one wavelength selection device according to the invention or a control device according to the invention as well as also a wavelength selection device according to the invention is provided.

Through the combination of a control device according to the invention and a wavelength selection device according to the invention radiation can be generated which, tuned to the sample to be studied and/or the photodiodes used, comprises precisely the correct spectral width and precisely the correct intensity or range of intensity, respectively.

According to a preferred embodiment, the radiation source is a substantially point-form radiation source of high luminous density, which is preferably imaged by an aspherical mirror, preferably an ellipsoidal mirror.

It is therein preferred if the control device is disposed between the radiation source and its image.

It is also preferred if for the optical energy propagation in the object space between the radiation source or its image, respectively, and the sample and/or between the sample and the receiver unit or the imaging unit, an optical waveguide is provided, and/or if for the optical energy propagation in the object space between the radiation source and its image, respectively, and the sample and/or between the sample and the receiver unit or the imaging unit, an aperture converter is provided which consists in each instance of a coaxial conical optical waveguide or mirror with a light entrance and a light exit opening, wherein the greater of the openings faces the sample.

For good energy efficiency it is favorable if the mirror of the illumination arrangement and the dispersion element of the wavelength selection device have an identical aperture.

Furthermore, according to the invention an optical system for radiometry is provided in which at least one receiver unit, which can be irradiated with radiation of a radiation source and which has a calibrated operating point, in which a specific output value of the receiver unit is assigned to a specific value of a radiometric parameter to be measured, and between the radiation source and the receiver unit in the path of the rays a control device according to the invention is provided such that by adjusting of the control device the output value of the receiver unit can be brought into agreement with the determined output value at the calibrated operating point of the receiver unit.

The optical system for radiometry according to the invention has the advantage that the complete information about the functional relationship between the radiation incident upon the receiver and the output value of the receiver can be omitted and that, nevertheless, a radiometric parameter to be measured can be determined over a broad measuring range. If, in a measurement of a new light source the control device is adjusted such that the output value of the receiver unit agrees with the determined output value at the calibrated operating point of the receiver unit, the relationship of unknown measured parameter to the known standard value can be determined based on the geometric transmission factor of the control device, which can be readily calculated from the area covered by the control elements and the total area of the control element available for the radiation passage.

If the operating point of the receiver unit has already been defined using a control device according to the invention, the transmission factor, used therein, of the control device must be taken into consideration when calculating the parameter to be measured.

The possibility to determine a radiometric parameter lastly through a geometric transmission factor is based on the observation that for radiometric, and thus substantially in energy measurements, the aperture of the radiation is of critical importance. For the by far major part of the beam geometries used in science and technology, a stopping-down of radiation at substantially constant aperture of the radiation leads also to the proportional decrease of the radiometric parameters. In contrast, the stopping-down of radiation in which the aperture of the radiation varies leads to the decrease of the radiometric parameters which is virtually not predictable. Drawing conclusions, from the geometric transmission factor of such a diaphragm according to prior art, on the radiometric parameter to be measured is not possible.

If the spectral dependence of radiometric parameters of a new light source is to be investigated, it is preferred if between the radiation source and the receiver unit a wavelength selection device, in particular a wavelength selection device according to the invention, is provided in the path of the rays.

It is furthermore preferred if between the radiation source and the control device and/or between the control device and the receiver unit means are provided which adapt the geometry of the radiation to the geometry of the control device/receiver unit.

If, in addition to the radiation source to be measured, also a standardized reference source and switch-over means are provided so that selectively either the radiation of the radiation source to be measured or the radiation of the reference radiation source can be conducted to the receiver unit, a very flexible configuration is obtained through which also the operating point of the receiver unit, adapted to the dynamic range of the receiver unit, and the parameter ratios of reference source to new radiation source can be selected rapidly and reliably.

Figure 2:
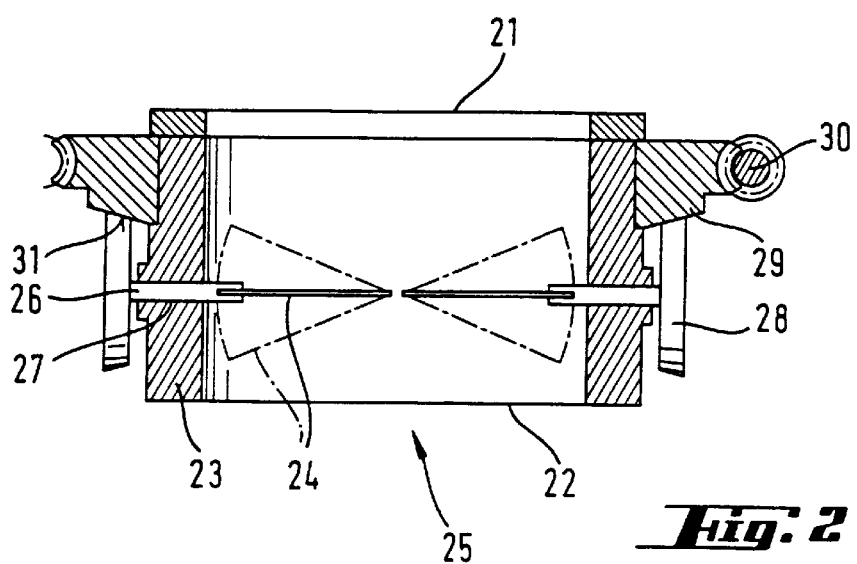
Figure 3:
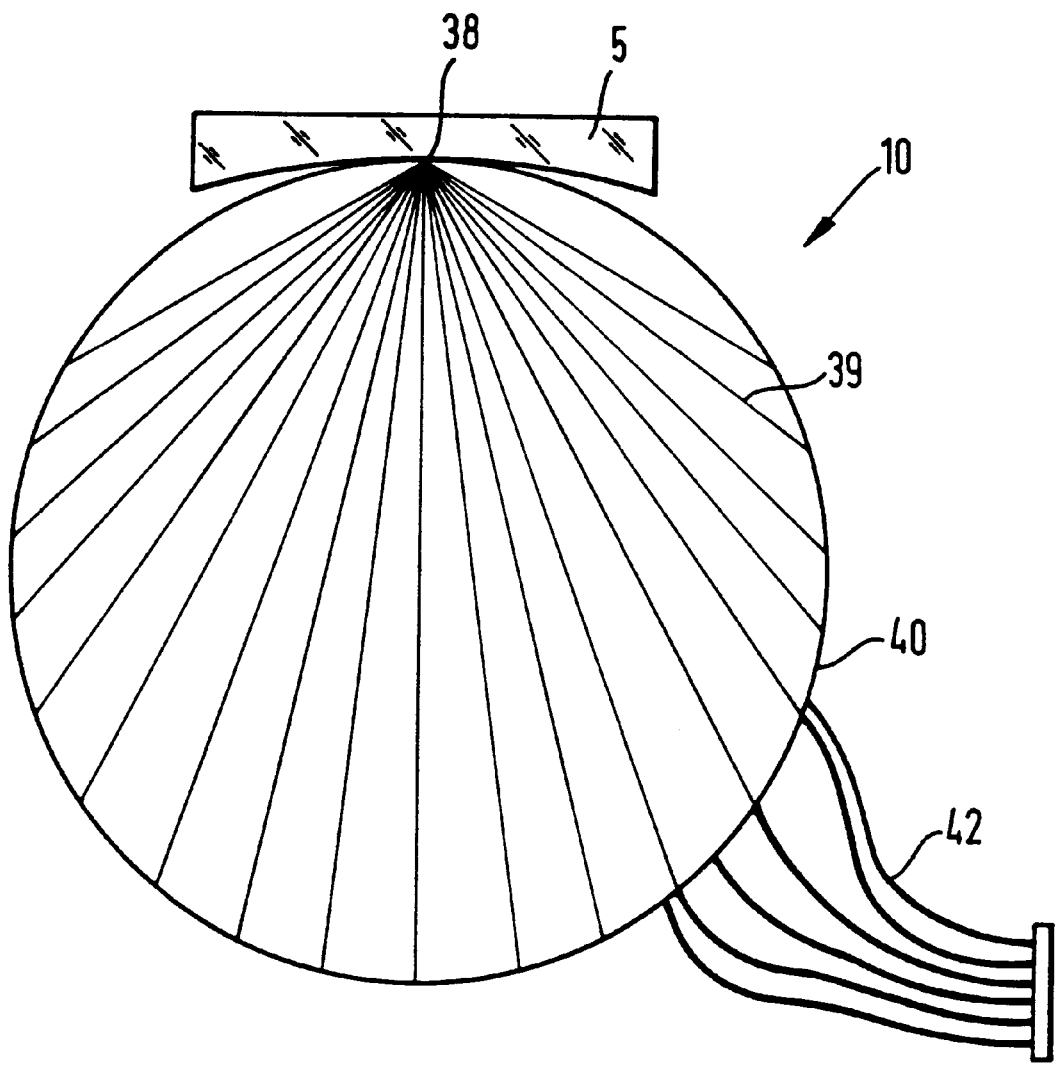
Figure 6A:
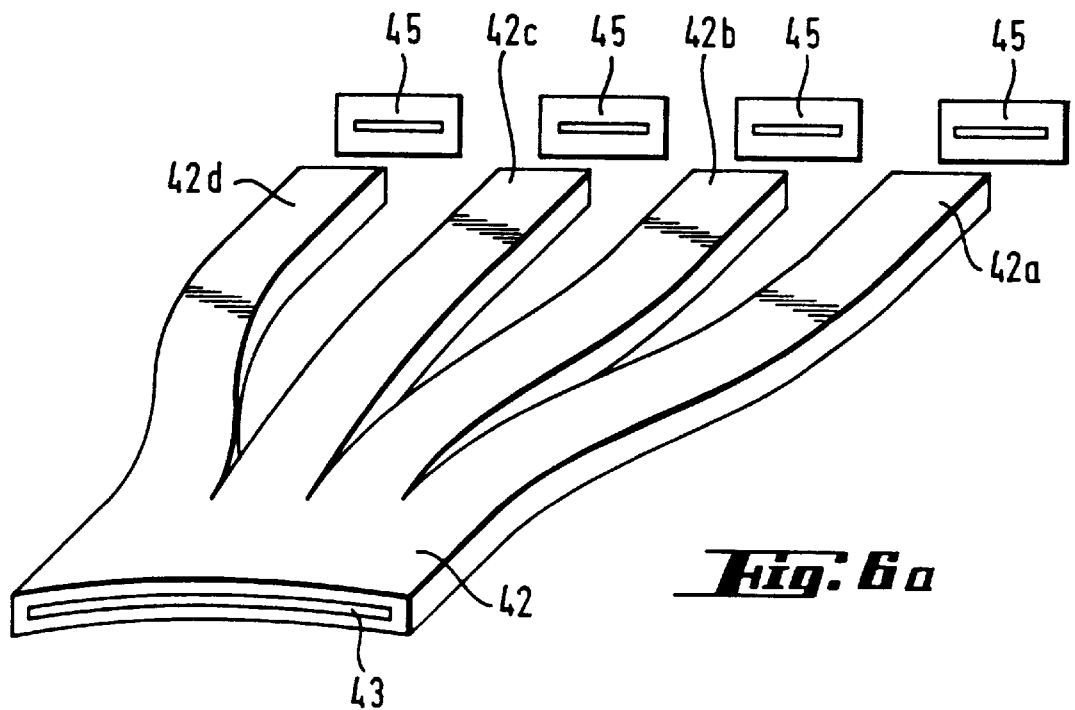
Figure 6B:
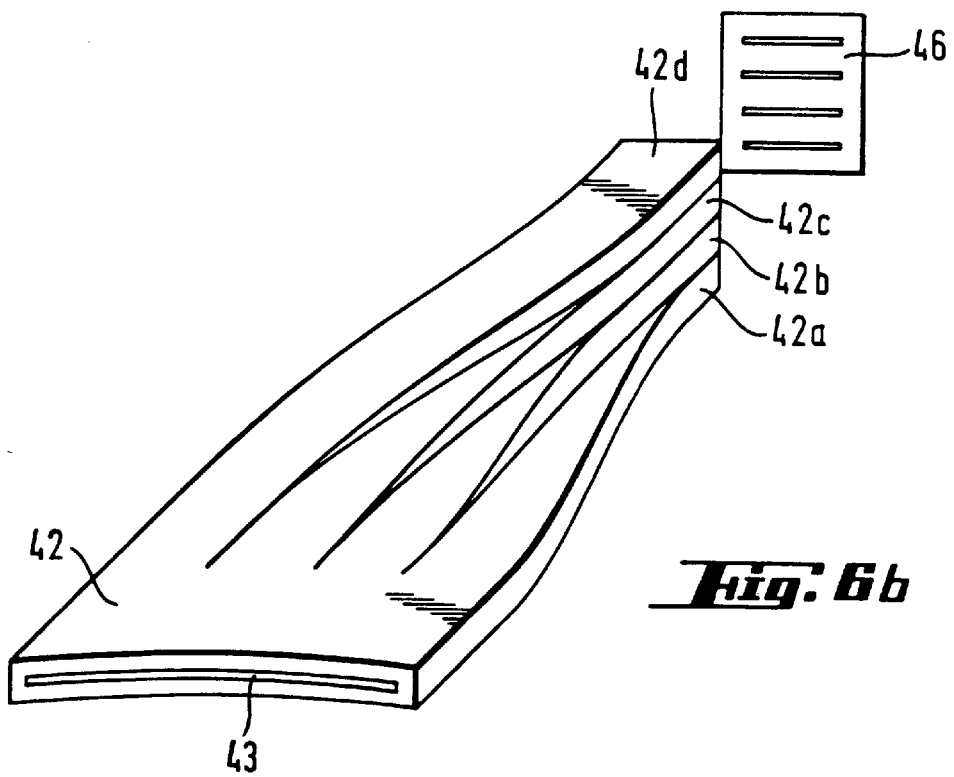
Figure 12:
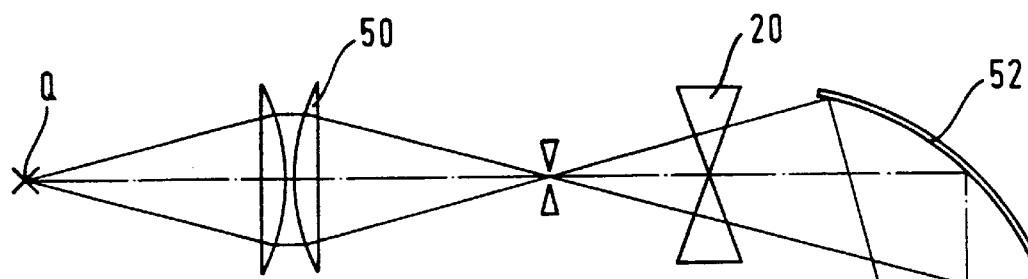
Figure 13:
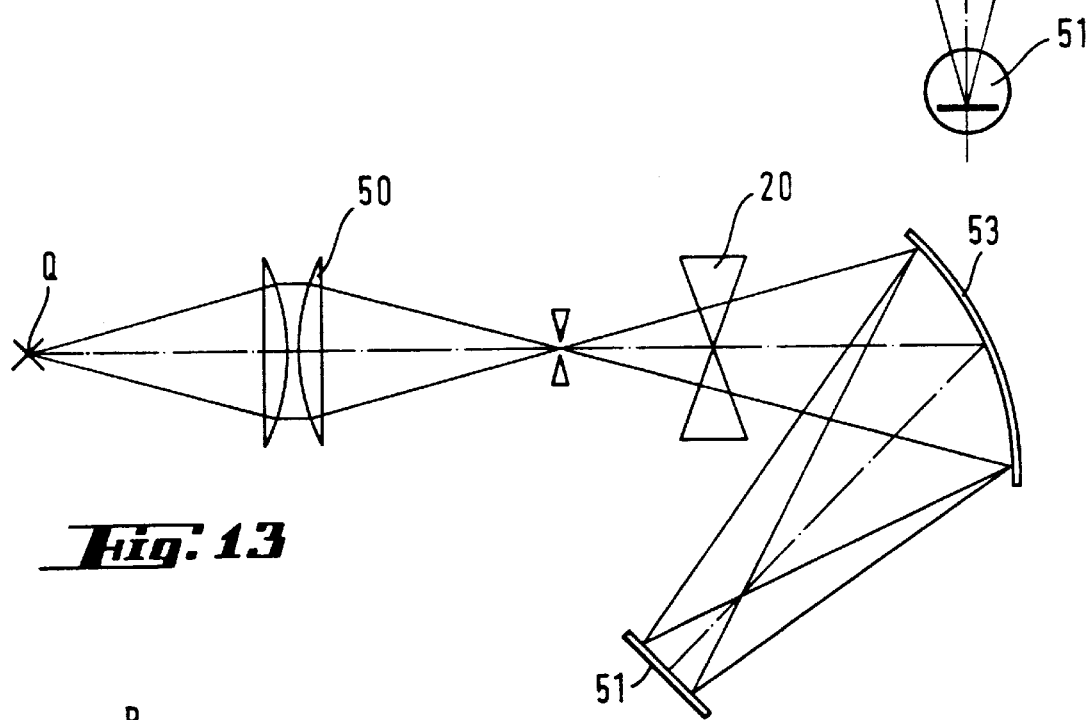
Figure 14:
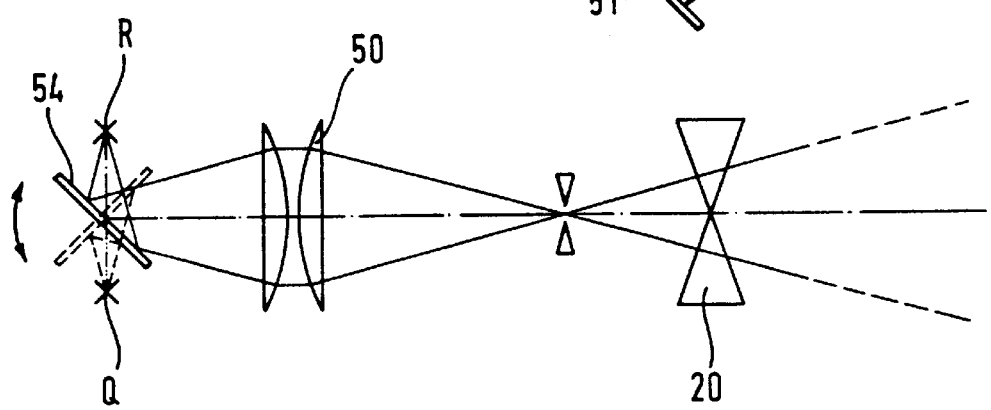

The enclosed drawings serve for further explaining the invention. Therein depict:

FIG. 1 top view onto a control device according to the invention;

FIG. 2 the control device according to the invention from FIG. 1 in cross section;

FIG. 3 schematic representation of the wavelength selection device according to the invention in Rowland configuration;

FIG. 4 the wavelength selection device according to the invention for generating two-beam spectra;

FIGS. 5a and 5b configurations of the optical waveguides for the wavelength selection device from FIG. 4 according to the invention;

FIGS. 6a and 6b split optical waveguides which permit spectral acquisition of any length;

FIG. 7 the wavelength selection device according to the invention for generating radiation with precisely defined spectral width;

FIG. 8 schematized representation of the essential portion of an endoscopic system according to the invention;

FIGS. 9 to 11 in schematized representation different spectroscopic systems according to the invention; and FIGS. 12 to 14 in schematized representation different radiometric systems according to the invention.

FIG. 1 shows a top view onto a control device 20 according to the invention. The control device 20 comprises an annular frame 23 defining a circular opening 25. In frame 23 are provided friction bearings 27 which receive the shafts 26 of circle segments 24. The circle segments 24 supported rotatably about their axis of symmetry function as control elements which, through their angular position, continuously control very sensitively the intensity of the radiation passing through opening 25 over the entire intensity range.

In conjunction with FIG. 1 it is readily evident that the control device 20 shown controls radiation, permeating the control device 20 centrally, at substantially constant aperture of the radiation. The opening 25 shown in FIG. 1 is centrally symmetrical. By changing the setting of the circle segments 24 the control device is converted from the closed state shown in FIG. 1 into a state having any desired opening. At any opened state not only are rays permitted to pass through the center of the control device 20 but also marginal rays in the proximity of frame 23.

This is in contrast to an iris diaphragm in which, in the process of opening the diaphragm, first only the central rays are allowed to pass through and the marginal rays are kept screened out. An iris diaphragm thus does not maintain the aperture of the screened-out radiation.

Moreover, the control device according to the invention has further advantages. If the ratio of free area to the area covered by the circle segments for an annular region of the opening 25 with fixed interval from the center is considered, it can be seen that this ratio is independent of the distance of the annular region from the center. The control device 20 exposes in any position of the circle segments 24 the exactly identical circumferential fraction, wherein the opening characteristic can be simply described with a sine function. This can be readily demonstrated for the photometric evaluation.

At a centered illumination of the control device 20, furthermore, no shift of the "center of gravity" of the radiation takes place. After passage through the control device, a circular beam has indeed a star-shaped cross section. However, as before, the center of this star corresponds to the center of the original circular beam.

For adjusting the position of circle segments 24 serve means 28, 29, 30 for position change, which comprise the bevel wheels 28, the spur gear 29 and the worm drive 30.

The function of means 28, 29, 30 for position change will be described in the following with reference to FIG. 2. FIG. 2 shows a cross section through a control device according to the invention. Frame 23 comprises friction bearings 27 in which the shafts 26 of the circle segments are rotatably supported. Through the setting angle of the circle segments 24 the intensity of the radiation is controlled, which is transmitted by the control device from the plane of incidence 21 to the plane of emergence 22. For the position change of the circle segments 24, the shafts 26 are connected with bevel wheels 28 on the outside of frame 23. Bevel wheels 28 comprise contact surfaces 32 which are in contact with a contact surface 31 of the spur gear 29. In order to be able to obtain so-to-speak an infinitely precise angular adjustment of the circle segments 24, the contact surfaces 32 of the bevel wheels 28 are not toothed but rather worked smooth. To prevent slip between the contact surfaces of the spur gear and the bevel wheels, the contact surfaces 31, 32 have a slope selected such that an extension of the contact surfaces toward the center of opening 25 is directed without offset to the intersection of the center axis of the spur gear and the axes of symmetry of the circle segments. To decrease the danger of slip further, permanent-magnet closure is provided between the bevel wheels and the spur gear. Most simply this is achieved thereby that into the bevel wheels small permanent magnets (not shown) are set and the spur gear 29 is produced of ferromagnetic material.

The spur gear 29, in turn, is driven by the worm drive 30. Through the combination of a worm drive with a spur gear and bevel wheels connected therewith, the position of all circle segments 24 can be changed in the same way simultaneously and reproducibly with high accuracy. The sensitivity and reproducibility of the setting meets therein the highest requirements. Since the circle segments 24 can be fully rotated through in bearings 27, they can be moved into any desired angular position. Even multiple rotations are possible without encountering difficulties. If a complete darkening of the control device is to be attained, the circle segments can also be laid out such that they slightly overlap when in the closed state. In this case multiple rotations are no longer possible. The worm drive 30 is driven manually or under computer control (not shown) such that regulation tasks of any degree of complexity can be realized.

FIG. 3 shows in schematic representation a wavelength selection device 10 according to the invention in Rowland configuration. At the vertex 38 of circle 40 is disposed tangentially shallow with twofold radius, the curved, concave diffraction grid 5. The lines 39 emanating in the form of a fan from this point to the circumference of the Rowland circle 40 are central rays of possible entrance and exit bundles. The conjugated locations of entrance slit and spectrum are on the arc of the circle. The associated splitting angles result from the direction of incidence and the grid constant (ruling density) of diffraction grid 5. Because the entrance slit 3 of the wavelength selection device 10 is preferably formed by optical waveguide fibers of quartz, the opening of the bundles is approximately 26°, which corresponds to a numerical aperture of 0.22.

The spectrum sought is also on circle 40 and is there acquired by optical waveguides 42 held by an arcuate socket (not shown). The optical waveguides 42 are therein combined to form a optical waveguide bundle comprising an uninterrupted (continuous) front face. The form of this front face is adapted to the focal surface (in this case to the Rowland circle), i.e. the ends of the discrete optical waveguides are disposed in the focal surface. It is consequently possible that a large continuous range of the spectrum can be acquired by optical waveguides 42. Through the adaptation of the front face of the optical waveguide bundle to the focal surface partial flattening of the focal surface can be completely omitted.

To ensure that the spectrally split radiation is acquired by the optical waveguides at good energy efficiency, the ends, disposed in the focal surface, of the optical waveguides are each individually oriented opposite to the particular central rays of the entrance slit. Through the dispersion element are generated, sorted according to wavelengths, an infinite number of images of the entrance slit in the focal surface. Each of these images has a central beam in whose direction the main portion of energy of the particular spectral component is propagated (in the particular order). Through the cited orientation of the optical waveguide ends the ends of the optical waveguides disposed in the focal surface form an extension of the particular central rays.

Such a configuration of the optical waveguides can be produced, for example, as follows. The optical waveguides of the optical waveguide bundle are "combed" and the optical waveguide bundle is oriented as a whole onto a selected central ray. This configuration of the optical waveguides is fixed and a forming foil is adhered onto the optical waveguide. The fixing is subsequently removed and the forming foil is pulled onto a forming body in order for the front face of the optical waveguide bundle to assume the shape of the focal surface at the desired location. During this forming the ends of the optical waveguides are correctly oriented for the normally used regions of the focal surface. The configuration thus obtained is subsequently fixed and the optical waveguide bundle disposed in the focal surface.

It is furthermore provided that the socket for the optical waveguide fibers of the entrance slit, as well as also the socket for the optical waveguide fibers 42 acquiring the spectrum, are movable along the focal surface 40.

The contour of the guideways for the sockets on the focal surface 40 is usefully asymmetrical so that the sockets can be set in form-fittingly and non-interchangeably.

The guideways are, in addition, coded in the manner of reference circles in order to be able to reproduce specific positions reliably. This coding can be performed mechanically by rastering, optically or electronically by magnetic strips.

If the wavelength selection device 10 according to the invention is used together with a receiver unit 2, on the receiver side (not shown), thus in front of the active areas of the diode rows or areal arrays, the optical waveguide bundle terminates in a socket with elongated planar surface adapted to the geometry of the diode configuration.

As was the case in the focal surface, here also a form-fitting and non-interchangeable connection is used. For this purpose onto the socket body of the diode configuration a so-called "keyhole mask" is placed into which the optical waveguide socket fits precisely as associated "key" such that the optical contact is established optimally and reproducibly without further scattered light. In this way it is also possible to omit windows in front of the diodes or to insert between the fiber ends and the diodes further optical elements, such as for example image amplifiers (channel plates).

FIG. 4 shows a wavelength selection device 10 for the generation of two-beam spectra. On the diffraction grid 5 two radiation bundles are incident which are conducted through the entrance slits 3 and 3' into the spectrometer. The entrance slits 3 and 3' are formed by the exit surface of two superjacent optical waveguide bundles separated by an interspace 35 (see FIG. 5a), which, independently of one another, are supplied by a measuring or comparison beam path, respectively. Correspondingly, on the spectra side two superjacent but independent spectral trains S and S' for the measuring and the comparison beam path are generated. The ends of the optical waveguides disposed in the focal surface are again oriented individually opposite to the particular central rays of the entrance slit.

The optical waveguide bundle 42 shown in FIG. 5a acquires both spectra S and S' of FIG. 4 in the focal surface with its uninterrupted (continuous) front face 43 and transmits them together to the receiver side 44. There, an areal array (not shown) is set in such that the spectra which had been acquired together, are lastly separated in the processing by the computer software. If, for reasons of greater sensitivity, on the receiver side so-called "double diode rows" with two parallel systems are set in, care must be taken that in the optical waveguide configuration shown in FIG. 5a the interval of the entrance slits 3 and 3' agrees with the interval of the two parallel row systems.

FIG. 5b shows a more expensive but in practice more flexible solution of a optical waveguide bundle 42a and 42b split horizontally. Both spectra S and S' are here also acquired in the focal surface with front face 43 but are subsequently transported spacially separated to the receiver side 44. With this configuration not only intervals can be varied more easily but also the types of diode rows.

FIGS. 6a and 6b show split optical waveguide bundles 42 which permit acquisition of spectra of any given length. A spectrum is therein acquired by the front face 43 of the optical waveguide bundle 42 in the focal surface and conducted, strictly ordered, to the diode rows 44 or to the areal array 45. Since the spectra can be longer than one diode row 44, the optical waveguide bundle is split vertically into discrete sections 42a–d and conducted to different individual rows (FIG. 6a). This is the simplest, most sensitive, but probably also the most expensive, solution. In FIG. 6b the discrete sections 42a–d are conducted in superjacent layers to an areal array. This makes clear the advantages of a single-chip operation with respect to hardware as well as also software, compact construction and uniform sensitivity.

This permits not only acquiring large spectra lengths with high resolution, which is very valuable for interferograms for example, but also to move simultaneously beyond critical range limits. For example, a spectral range from 700 to 1500 nm can be acquired simultaneously. With the configuration according to the invention, the range from 700 to 1100 nm for example would be conducted with the one half of a optical waveguide bundle to an SB or a TH row by RETICON, the segment from 1100 to 1500 nm with the second half of the optical waveguide bundle to an SI row by RETICON.

New, ultraviolet-sensitive CCD arrays can also be used as receiver units, which, due to their extremely narrow rasters, permit high spacial resolution. By using new quartz optical waveguide fibers "Suprasil 300", radiation of a wavelength up to 3 $\mu$m can also be transmitted. As a result, the configuration according to the invention with a minimum of structural elements compatible with one another can open up the entire spectral range from 200 to 3000 nm for spectrometry. The spectral segments can be selected as desired according to length and position. Single and multiple beam operation is possible with the same structural elements. The dynamic and optical resolution is readily optimizable for all application cases. The strictly modular concept permits a high degree of universality with minimum expenditures.

FIG. 7 shows the wavelength selection device according to the invention for generating radiation with precisely defined spectral width. Onto the diffraction grid 5 is incident a radiation bundle which is conducted through the entrance slit 3 into the wavelength selection device 10. This radiation is spectrally split through the diffraction grid 5 and spectrum S is generated in the focal surface 40. A predetermined range of spectrum S is acquired by the optical waveguides 47 and conducted in a short arc to another location in the focal surface 40. The configuration of those ends of the optical waveguides 47 emitting the radiation is symmetrical to the configuration of those ends of the optical waveguides 47 acquiring the radiation. The mirror-symmetrical plane is given in FIG. 7 by circle 40 which simultaneously denotes a portion of the focal surface. The radiation from the exit surface of the optical waveguide bundle radiates back to the diffraction grid 5 and, according to the law of invertibility of the ray paths, is combined again at the location of the exit slit 3'. At the location of the exit slit 3' thus radiation of a precisely defined spectral width and precisely defined geometry and aperture is generated. This radiation can now be conducted through further optical waveguides to a sample.

It is clearly evident that only radiation from the selected spectral range can reach the exit slit. By shifting the optical waveguides 47 on the focal curve 40 or by diaphragms or templates, disposed in front of the optical waveguides 47, the spectral range, which is to be used for the subsequent examinations of the samples, can be freely selected. Device 10 acts thus as a spectral universal filter which can be inserted into the beam guidance between the location of the light source image L' (see FIG. 11) and the aperture converter 14.

An optical system according to the invention for endoscopy will be described in the following in conjunction with FIG. 8.

The radiation emanating from a light source L is irradiated by means of an ellipsoidal mirror 7 into a optical waveguide 16. Through the optical waveguide the radiation is conducted into the region of a sample 9 which is illuminated with the radiation from optical waveguide 16. The radiation reflected by the sample 9 is subsequently acquired by an imaging arrangement (not shown) and for example supplied to an observer. If as light source L a xenon discharge is used, the average intensity output into a solid angle of 0.25 sr is 0.5 mW/nm. This can be transmitted by mirror 7 and optical waveguide 16 to the sample 9. Sample 9 is thus extremely brightly illuminated.

Control device 10 according to the invention disposed between light source L and ellipsoidal mirror 7 can now be used for the purpose of adjusting the illumination of sample 9 in a way appropriate for the particular task. By using the control device according to the invention an observer in endoscopy always obtains a fully illuminated field of vision since the irregularities in the angle distribution of the radiation, induced by the control device, can be compensated again through the integrating effect of the optical waveguide. With the actuation of the control device, thus only the brightness changes, but not the field of vision or the color of the light.

An optical system according to the invention for spectroscopy will be described in the following in conjunction with FIG. 9.

The object space 8 between spectrometer 1 and illumination device 6 contains a sample 9. On both sides of sample 9 one aperture converter 14, 15 each is disposed which consists of a coaxial conical optical waveguide or mirror with a light entrance and a light exit opening and a reflecting or completely reflecting inner surface. In addition, two optical waveguides 16 are provided which conduct, on the one hand the radiation from the illumination device 6 to the aperture converter 14 and, on the other hand, the radiation from aperture converter 15 to spectrometer 1.

The aperture converter 14 disposed between image L', light source L and sample 9, is coupled with its smaller cross sectional opening, forming the light entrance opening or area via a section of the optical waveguide 16 into the plane of image L' of light source L, while its larger cross sectional opening or area, forming the light exit opening, is coupled to the entrance window of sample 9. The light entrance opening and the light exit opening of the aperture converter are preferably cross sectional openings extending perpendicularly to the optical axis. The aperture converter 15 disposed between sample 9 and entrance slit 3 of the spectrometer 1 corresponds identically with respect to its structure to the aperture converter 14, wherein, relative to sample 9, it is built in mirror-symmetrically to the latter such that its light exit opening formed by the smaller cross sectional opening or area is coupled via a section of the optical waveguide 16 into the plane of the entrance slit 3, while its light entrance opening formed by the greater cross sectional opening or area is coupled to the exit opening of sample 9.

The illumination arrangement 6 comprises a radiation source L, of maximal point form, of maximum luminous intensity, for example a xenon high-pressure arc lamp. It is operated at constant power. The radiation emitted by the radiation source L is reflected from an aspherical ellipsoidal mirror 7 into the object space 8. In the process an image L' of the radiation source L is formed. In front of the aspherical ellipsoidal mirror 7 is disposed a control device 20 according to the invention for controlling the radiation intensity, which was described in further detail with respect to FIGS. 1 and 2.

Succeeding the object space 8 is disposed a wavelength selection device 10 and a receiver unit 2. Radiation from the object space passes through the entrance slit 3 of the wavelength selection device 10 and is spectrally split through the holographically generated concave grating 5 and focused onto the receiver unit 2. So that a "complete representation" is attained, thus the strictly conjugated sequence of source diaphragm-objective diaphragm etc., the aspherical ellipsoidal mirror 7 has the dimension of the holographically generated concave grating 5 of the wavelength selection device 10. In particular, both elements have the identical opening α.

The receiver unit 2 comprises a diode row such that the spectrometer 1 forms a simultaneous spectrometer.

If as the light source L a xenon discharge is used, the sample 9 is transilluminated quasi-parallel with an intensity of the order of magnitude of 1 mW/nm. This corresponds to values of conventional laboratory lasers. This intensity is above the saturation values of conventional diode rows.

Through the control device 20 according to the invention the intensity of the radiation can be reduced to the value optimal for a diode row without the other characteristics of the radiation being changed. If the sample absorbs the radiation so strongly that the linear dynamic range of the diode row is exceeded (extinction 2–3), the control device 20 can be opened correspondingly resulting overall in a measuring range of approximately 6 extinction stages.

FIG. 10 shows a further embodiment of an optical system according to the invention for spectroscopy.

The object space 8 between spectrometer 1 and illumination arrangement 6 comprises a sample 9 taken up in a cell. On both sides of sample 9 an aperture converter 14, 15 is disposed which consists of a coaxial conical optical waveguide or mirror with a light entrance and a light exit opening and a mirroring or totally reflecting inner surface.

In front of image L' of the radiation source L is disposed a control device 20 according to the invention for controlling the radiation intensity.

Succeeding the object space 8 is disposed a wavelength selection device 10 according to the invention and a receiver unit 2. Radiation from the object space passes through the entrance slit 3 of the wavelength selection device 10 and is spectrally split through the holographically generated concave grating 5 and focused onto the focal surface 40. In order for a "complete representation" to be attained, thus the strictly conjugated sequence of source diaphragm-objective diaphragm etc., the aspherical ellipsoidal mirror 7 has the dimension of the holographically generated concave grating 5 of the wavelength selection device 10. In particular, both elements have the identical opening α. The radiation, spectrally split by the concave grating 5 and focused into the focal surface, is received by a bundle of optical waveguides 42 in the focal surface 40 and conducted to the diode row 2 which functions as receiver unit. Together with the receiver unit 2, thus the wavelength selection device according to the invention forms a spectrometer 1, in particular a simultaneous spectrometer.

Through the control device 20, on the one hand, and the optical waveguides 42 in spectrometer 1, on the other hand, the sample can be examined over a wide intensity range and over a wide wavelength range without changes in the experimental setup becoming necessary.

FIG. 11 shows a third embodiment of an optical system according to the invention for spectroscopy.

The configuration shown in FIG. 11 corresponds largely to the optical system shown in FIG. 9 with the exception that between the illumination arrangement 6 and the object space 8 a wavelength selection device according to the invention is provided, which has already been described in connection with FIG. 7. The connection of illumination arrangement 6 to the wavelength selection device takes place via a further optical waveguide 16.

The radiation conducted to the wavelength selection device is spectrally split by the diffraction grid 5 and in the focal surface 40 spectrum S is generated. A predetermined range of spectrum S is acquired by the optical waveguides 47 and conducted in a short arc to another location in the focal surface 40. The configuration of the ends, emitting the radiation, of the optical waveguides 47 is symmetrical to the configuration of the ends, acquiring the radiation, of the optical waveguides 47. The radiation from the exit surface of the optical waveguide bundle radiates back onto the diffraction grid 5 and, according to the law of invertibility of the ray paths, is combined again at the location of the exit slit. At the location of the exit slit thus radiation of precisely defined spectral width and precisely defined geometry and aperture is generated.

Sample 9 is thus loaded only with the spectral component of the radiation which is desired or necessary for a measurement. The configuration shown in FIG. 11 permits, in addition, acquiring fluorescence, excitation and emission spectra in a simple manner.

Optical systems according to the invention for radiometry will be described in the following in conjunction with FIGS. 12 to 14.

The radiation emitted by a radiation source Q to be measured is imaged via a lens condenser 50 onto the entrance opening of a radiometer. The radiometer comprises a control device 20 according to the invention, a concave reflector 52 or a concave grating 53, respectively, and a receiver unit 51. The selection of possible receiver units extends from thermoelements for absolute measurements via photodiodes to selective multipliers.

With this configuration now a measurement of radiometric parameters of a radiation source can be carried out as follows. First, the receiver unit is irradiated with the radiation of a standardized radiation source. The output value obtained of the receiver unit is assigned to the known value for the standardized radiation source of the radiometric parameter to be measured. Therewith an operating point of the receiver unit has been defined.

Subsequently, as shown in FIG. 12, the receiver unit is irradiated with the radiation of the radiation source Q to be measured. By adjusting the control device 20, the radiation of source Q is decreased until the output value of the receiver unit agrees with the output value at the operating point of the receiver unit.

If the control device 20 is adjusted such that the output value of the receiver unit agrees with the determined output value at the calibrated operating point of the receiver unit, the ratio of unknown measured parameters to the known standard value can be determined from the geometric transmission factor of the control device, which can be readily calculated, on the one hand, from the area covered by the control elements and the total area of the control element available for the radiation passage. For the vast majority of the beam geometries used in science and technology applies:

Transmission factor=covered area/total area.

Through the concave grating 53 shown in FIG. 13 the same procedure can also be carried out selectively for specific wavelengths or wavelength ranges.

If, as shown in FIG. 14, additionally switch-over means 54, such as a turning mirror and a standardized reference source R are provided, the determination of the operating point and the measurement proper can be carried out with a configuration rapidly and simply by actuating the switch-over means.

I claim:

1. A wavelength selection device, in particular for spectroscopy, endoscopy and/or radiometry systems, comprising at least one dispersion element for the spectral splitting of a radiation incident through at least one entrance slit upon the dispersion element, wherein the dispersion element and/or a focusing element focuses the spectrally split radiation onto a focal surface, as well as further comprising a receiver unit, at least one optical waveguide bundle of several optical waveguides is provided, which acquires a predetermined range of the spectrally split radiation in the focal surface and is arranged to conduct the acquired radiation to the receiver unit, wherein the at least one optical waveguide bundle comprises a substantially uninterrupted front face and the receiver unit comprises at least one photodiode configuration.

2. A wavelength selection device according to claim 1, wherein the ends, disposed in the focal surface, of the optical waveguides of the optical waveguide bundle are in each instance oriented individually toward the dispersion element or oriented opposite to the center ray of the particular beam image of the entrance slit.

3. A wavelength selection device according to claim 1, characterized in that several optical waveguides are provided laid out in order.

4. A wavelength selection device according to claim 1, wherein said optical waveguide bundle is retained in a socket and is movable along the focal surface, wherein the contour of the guideway of the socket of the optical waveguide bundle can be asymmetrical.

5. A wavelength selection device according to claim 1, wherein said optical waveguide bundle terminates in a socket with elongated planar surface adapted to the geometry of the photodiode configuration.

6. A wavelength selection device according to claim 5, wherein said optical waveguide bundle is subdivided and can be conducted to several diode rows and/or an areal configuration of photodiodes.

7. A wavelength selection device according to claim 1, wherein said dispersion element is a prism.

8. A wavelength selection device according to claim 1, characterized in that between the entrance slit and the dispersion element is a control device.

9. A waveguide selection device according to claim 1 wherein the front face is adapted to the focal surface.

10. A waveguide selection device according to claim 9 wherein the photodiode configuration is a diode row.

11. A waveguide selection device according to claim 1 wherein the photodiode configuration is a diode row.

12. A waveguide selection device according to claim 4 wherein the guideway is provided with a coding.

13. A waveguide selection device according to claim 7 wherein said prism comprises a Féry prism.

14. A waveguide selection device according to claim 1 wherein said dispersion element is a diffraction grid comprising sine rulings, rectangular rulings, or sawtooth rulings.

15. A waveguide selection device according to claim 14 wherein said diffraction grid is a concave grating.

16. A waveguide selection device according to claim 14 wherein said diffraction grid comprises a holographic diffraction grating.

17. A wavelength selection device, in particular for spectroscopy, endoscopy and/or radiometry systems, comprising at least one dispersion element for the spectral splitting of radiation incident through at least one entrance slit upon the dispersion element, wherein the dispersion element and/or a focusing element focuses the spectrally split radiation onto a focal surface, as well as further comprising a receiver unit, characterized in that at least one optical waveguide bundle of several optical waveguides is provided, which acquires a predetermined range of the spectrally split radiation in the focal surface, wherein the optical waveguide bundle comprises a substantially uninterrupted front face, and the receiver unit comprises at least one photodiode configuration, wherein the at least one optical waveguide bundle conducts the acquired radiation again onto the dispersion element such that at an exit slit of the wavelength selection device radiation can be generated which comprises a predetermined spectral range, wherein the configuration of the ends emitting the radiation of the optical waveguides is selected so as to be symmetrical to the configuration of the ends, acquiring the radiation of the optical waveguides.

18. A wavelength selection device according to claim 17 wherein said optical waveguides of the optical waveguide bundle conduct the radiation acquired in the focal surface again into the focal surface and emit said radiation in the direction toward the dispersion element.

19. A wavelength selection device according to claim 18, wherein said optical waveguides of the optical waveguide bundle conduct the radiation acquired in the focal surface again into the focal surface such that the configuration of the optical waveguide ends, acquiring the radiation, is mirror-symmetrical to the configuration of the optical waveguide ends emitting the radiation.

20. A wavelength selection device according to claim 17, wherein said radiation generated at the exit slit can be conducted to an aperture converter which comprises a coaxial conical optical waveguide or mirror with a light entrance and a light exit opening such that a substantially parallel ray bundle with a predetermined spectral range can be generated.

21. A wavelength selection device according to claim 17, wherein the ends, disposed in the focal surface, of the optical waveguides of the optical waveguide bundle are in each instance oriented individually toward the dispersion element or oriented opposite to the center ray of the particular beam image of the entrance slit.

22. A wavelength selection device according to claim 17, characterized in that several optical waveguides are provided laid out in order.

23. A wavelength selection device according to claim 17, wherein said radiation generated at the exit slit can be conducted to an aperture converter which comprises a coaxial conical optical waveguide or mirror with a light entrance and a light exit opening such that a substantially parallel ray bundle with a predetermined spectral range can be generated.

24. A wavelength selection device according to claim 17, wherein said optical waveguide is retained in a socket and is movable along the focal surface, wherein the contour of the guideway of the socket of the optical waveguide can be asymmetrical.

25. A wavelength selection device according to claim 17, wherein said optical waveguide bundle terminates in a socket with elongated planar surface adapted to the geometry of the photodiode configuration.

26. A wavelength selection device according to claim 17, wherein said optical waveguide bundle is subdivided and can be conducted to several diode rows and/or an areal configuration of photodiodes.

27. A wavelength selection device according to claim 17, wherein said dispersion element is a prism.

28. A wavelength selection device according to claim 17, characterized in that between the entrance slit and the dipersion element is a control device.

29. A waveguide selection device according to claim 17 wherein the front face is adapted to the focal surface.

30. A waveguide selection device according to claim 29 wherein the photodiode configuration is a diode row.

31. A waveguide selection device according to claim 17 wherein the photodiode configuration is a diode row.

32. A waveguide selection device according to claim 24 wherein the guideway is provided with a coding.

33. A waveguide selection device according to claim 27 wherein said prism comprises a Féry prism.

34. A waveguide selection device according to claim 17 wherein said dispersion element is a diffraction grid comprising sine rulings, rectangular rulings, or sawtooth rulings.

35. A waveguide selection device according to claim 34 wherein said diffraction grid is a concave grating.

36. A waveguide selection device according to claim 34 wherein said diffraction grid comprises a holographic diffraction grating.

* * * * *